United States Patent
Jost et al.

(10) Patent No.: US 8,469,636 B2
(45) Date of Patent: Jun. 25, 2013

(54) COMMODITY SPLITTER FOR AN AIR DELIVERY SYSTEM

(75) Inventors: Brian Patrick Jost, Eldridge, IA (US); Paul R. Riewerts, Port Byron, IL (US); Robert T. Casper, Ankany, IA (US)

(73) Assignee: Deere & Company, Moline, IL (US)

( * ) Notice: Subject to any disclaimer, the term of this patent is extended or adjusted under 35 U.S.C. 154(b) by 429 days.

(21) Appl. No.: 12/816,809

(22) Filed: Jun. 16, 2010

(65) Prior Publication Data

US 2011/0311322 A1   Dec. 22, 2011

(51) Int. Cl.
B65G 53/52   (2006.01)
A01C 7/08   (2006.01)

(52) U.S. Cl.
CPC ............. *B65G 53/528* (2013.01); *A01C 7/084* (2013.01)
USPC ............................ 406/181; 111/174; 111/175

(58) Field of Classification Search
CPC .......... A01C 7/081; A01C 7/082; A01C 7/084
USPC ......... 406/155, 181, 191, 193, 195; 111/174, 111/175
See application file for complete search history.

(56) References Cited

U.S. PATENT DOCUMENTS

| | | | | |
|---|---|---|---|---|
| 1,850,937 A * | 3/1932 | Messinger | ..................... | 406/181 |
| 1,871,853 A * | 8/1932 | Kennedy | ..................... | 406/181 |
| 2,062,295 A * | 12/1936 | Cary et al. | ..................... | 406/100 |
| 4,497,345 A * | 2/1985 | Lees | ..................... | 138/39 |
| 4,717,289 A * | 1/1988 | Popowich et al. | ............ | 406/122 |
| 4,808,043 A * | 2/1989 | Le Marrec et al. | ........... | 406/181 |
| 5,074,228 A | 12/1991 | Daws | | |
| 6,290,433 B2 * | 9/2001 | Poncelet et al. | ............. | 406/181 |
| 7,213,525 B2 | 5/2007 | Meyer et al. | | |
| 7,213,617 B2 | 5/2007 | Snipes et al. | | |

* cited by examiner

*Primary Examiner* — Gene Crawford
*Assistant Examiner* — William R Harp

(57) ABSTRACT

A commodity splitter for granular agricultural material includes a chamber having a central section located between an input port and multiple output ports. The central chamber section includes upper and lower planar walls joined by parallel, vertical side walls. First individual upright diverting fins are joined to and extend towards the bottom wall from the upper wall and have respective lower longitudinally extending edges spaced above upper longitudinal edges of second individual upright diverting fins joined to and extend toward the upper wall from the lower wall. The first and second upright fins, respectively, together with the top and bottom walls and opposite side walls form upper and lower vertically spaced material directing channels for directing material from the input port to the outlet ports. The space between the upper and lower channels defines a blockage preventing and pressure-equalizing open area.

17 Claims, 8 Drawing Sheets

COMMODITY SPLITTER FOR AN AIR DELIVERY SYSTEM

FIELD OF THE INVENTION

The present invention relates generally to air delivery of particulate matter and, more specifically, to a splitter for dividing a flow of agricultural particulate material from a single conduit to multiple conduits.

BACKGROUND OF THE INVENTION

Commodity carts are limited in the number of metered or primary runs for distributing product by an air conveyance method. Air towers mounted on the implement are commonly used to divide each primary run in to numerous secondary runs which extend to ground-engaging tools for distributing the product to the ground. The air towers extend vertically and can present interference problems on a folding implement because of space constraints. Connecting the vertical tower to the implement frame can be difficult. The air tower design often requires the secondary hoses which connect to the upper end of the tower in a radial pattern to extend vertically and bend sharply to reach the desired location for product placement. Such routing is an impediment to efficient, uniform product flow and an uncluttered appearance. When the commodity to be delivered to the ground is a material such as fertilizer, moisture conditions can cause clumps to form which can cause blockages in the dividing structure that can interrupt flow to a number of the secondary runs.

An example of currently available distribution configurations includes conduit structure with six primary runs connected to two-way splitters to provide twelve runs which are each then split to twenty-four secondary runs that feed the ground-engaging tools or other distribution devices. If instead of six primary runs, eight primary runs are provided and divided into three secondary runs, the maximum achievable delivery rate from the cart can be increased by a third. For example, a commodity cart feeding twenty-four shanks may utilize eight primary runs, and a three-way splitter is needed to utilize all eight primary runs for the maximum achievable rate from the cart. A splitter with an uneven number of outputs is required to evenly distribute product to an odd number of delivery points.

SUMMARY OF THE INVENTION

A compact three-way commodity splitter is mounted horizontally on a folding implement and provides a more streamlined mounting appearance. The splitter is easier to mount on the implement frame, and multiple splitters may be stacked to in an easily accessible area. The reduction in height by eliminating tower structures improves mounting location selection and reduces impediments to folding when used on hinged implement frames.

Sharp bends in secondary hoses are reduced or eliminated, and the conveyed material progresses through the delivery system generally without substantial changes in direction. The input to the splitter includes a dimpled tube of circular cross-section to straighten material flow and mix the commodity with the air stream. The mixture enters a chamber which diverges from a round connection with the dimpled tube into rectangular configuration. Fins located inside the chamber mechanically divert both air and any product which is not suspended in the air stream. A plurality of rectangular tubes having rounded ends located at the downstream end of the converging chamber facilitate attachment of the secondary hoses.

The fins may be located in various configurations within the chamber to provide blockage reduction and pressure and flow equalization. For example, the fins can project from the bottom only or the top only of the chamber. Alternatively, two sets of fins, one extending upwardly from the bottom of the chamber and one extending downwardly from the top of the chamber may be provided. The fin size and a fin taper in the direction of particle flow may be varied depending on the commodity conveyed and the gap desired. An enlarged gap defined by offset fin edges reduces blockages by allowing passage of small clumps of conveyed material that could otherwise lodge between fins if a continuous fin design were used. The partial fin design allows pressurized air to more evenly fill the chamber for more uniform product delivery through the splitter even if a portion of an upstream area of the splitter is blocked.

As material clumps are broken and product is diverted into the air stream, the mixture of air and product divides evenly as it flows over and around the fins. The space between the fins will allow clumps of product, that could plug between continuous top to bottom fins, to move through the open space inside this splitter. The fins are also sloped in relation to the air stream to engage more air and product as the mixture moves downstream into the splitter and help to break up the clumps.

In one example of the invention using eight three-way splitters, a commodity cart with eight primary runs can supply twenty-four secondary runs to help maximize conveying capacity. A three way splitter is also capable of providing the capability of an odd number of secondary runs in a manner that can not be achieved using two-way splitters.

Compactness and appearance of the complete system is improved, and sharp turns are minimized. Primary and secondary run hoses may be extended generally parallel to each other along a routing path having a substantial portion parallel to and closely adjacent an implement frame member for added hose protection. Eliminating towers reduces routing path size and vertical runs. The reduction of the hose path bends provides a more efficient use of hose material and a better product flow that requires less air power. The required mounting space is reduced compared to tower designs. The splitter may be attached in a generally parallel relationship with the frame member so that simple and easily accessible mounting brackets may be used. The narrow profile permits splitters to be stacked in a centralized connection area.

These and other objects, features and advantages of the present invention will become apparent from the drawing taken in view of the detailed description below.

DETAILED DESCRIPTION

Figure 1:
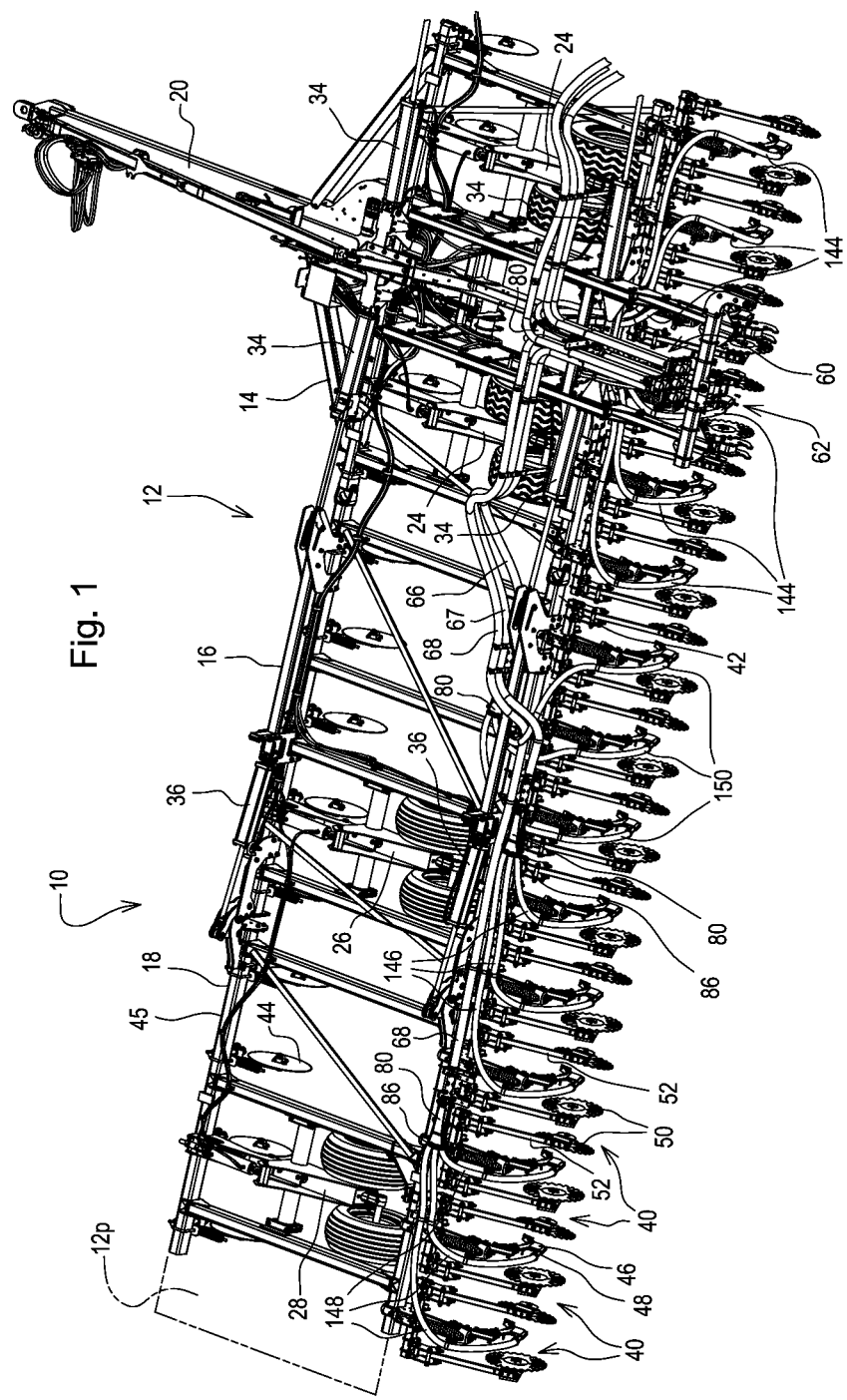
FIG. 1 is a rear perspective view of a portion of an implement having an air system and tools for delivering a commodity to the soil.
Figure 2:
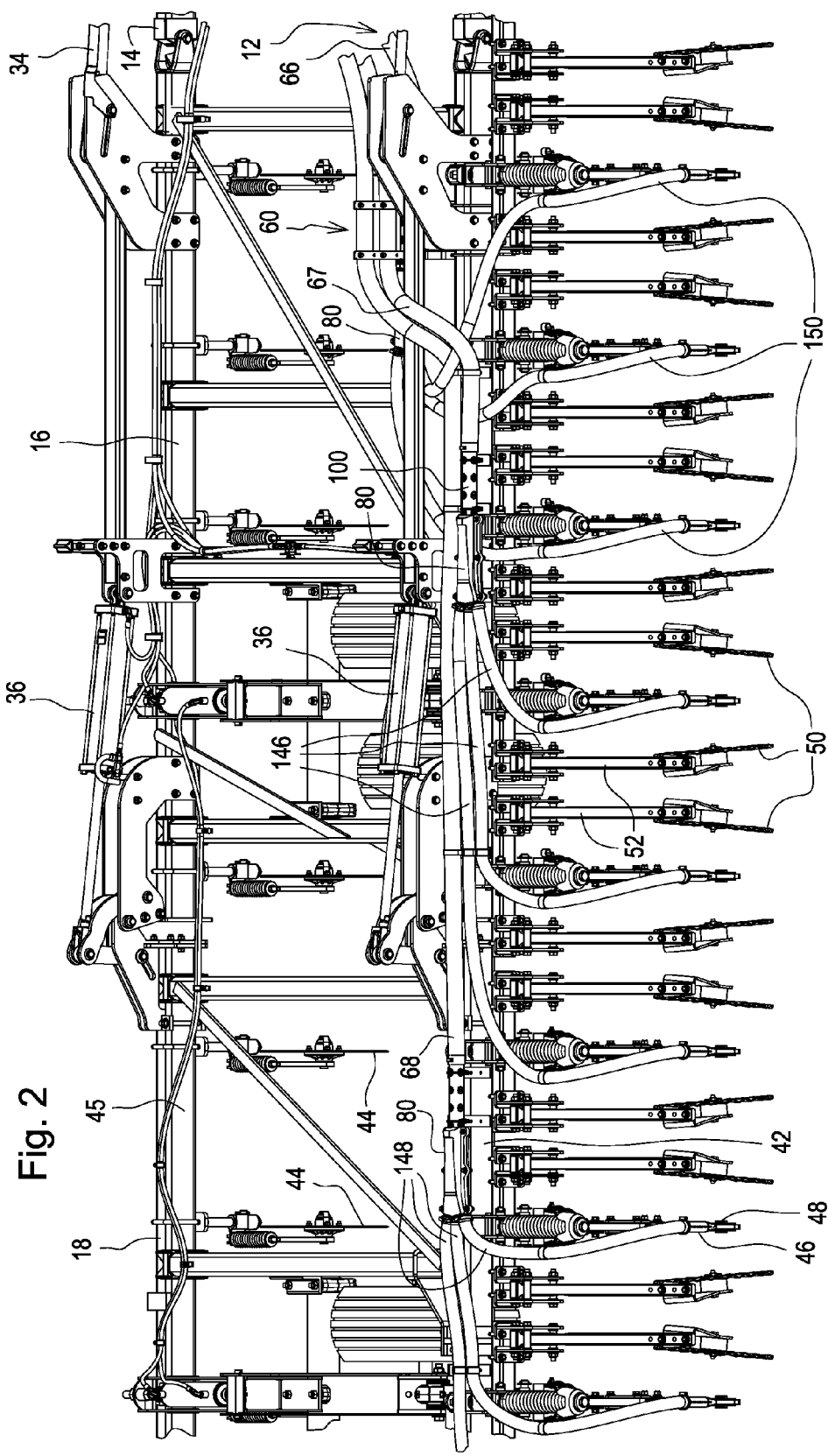
FIG. 2 is a top enlarged view of a portion of the implement of FIG. 1.

Referring to FIG. 1, therein is shown a portion of a soil treatment implement 10 having a rectangular main frame 12 which includes a center section 14, an inboard wing section 16 hinged to the center section 14, and an outboard wing section 18 hinged to the center section 16. The right side of the implement 10 is generally the mirror image of the left side shown in FIG. 1. A central towing hitch 20 is connected to the front of the center section 14; and lift wheel assemblies 24, 26 and 28 support the frame 12 for forward movement over the ground.

Folding cylinders 34 and 36 pivot the wing sections 16 and 18 about fore-and-aft extending pivotal axes between an unfolded frame field-working position (shown) and a folded frame field-working position. In the folded position, the outboard wing sections 16 and 18 are folded adjacent each other and then lifted over the center section 14.

Commodity delivery tools indicated at 40 are spaced transversely along rear main frame tube structure 42 of the main frame 12. As shown, the implement 10 is a fertilizer application device with forward sizing and slot initiating disks 44 supported forwardly of the tools 40 on front transverse tube structure 45 of the frame 12. The tools 40 include fertilizer shanks 46 with points opening the slots initiated in the soil by the disks 44. Granular fertilizer delivery tubes 48 are supported behind the shanks 46 for delivering fertilizer below the surface of the ground to the areas opened by the points. Closing disks 50 supported by arms 52 connected to the tube structure 42 close the slots after the fertilizer is deposited.

Figure 3:
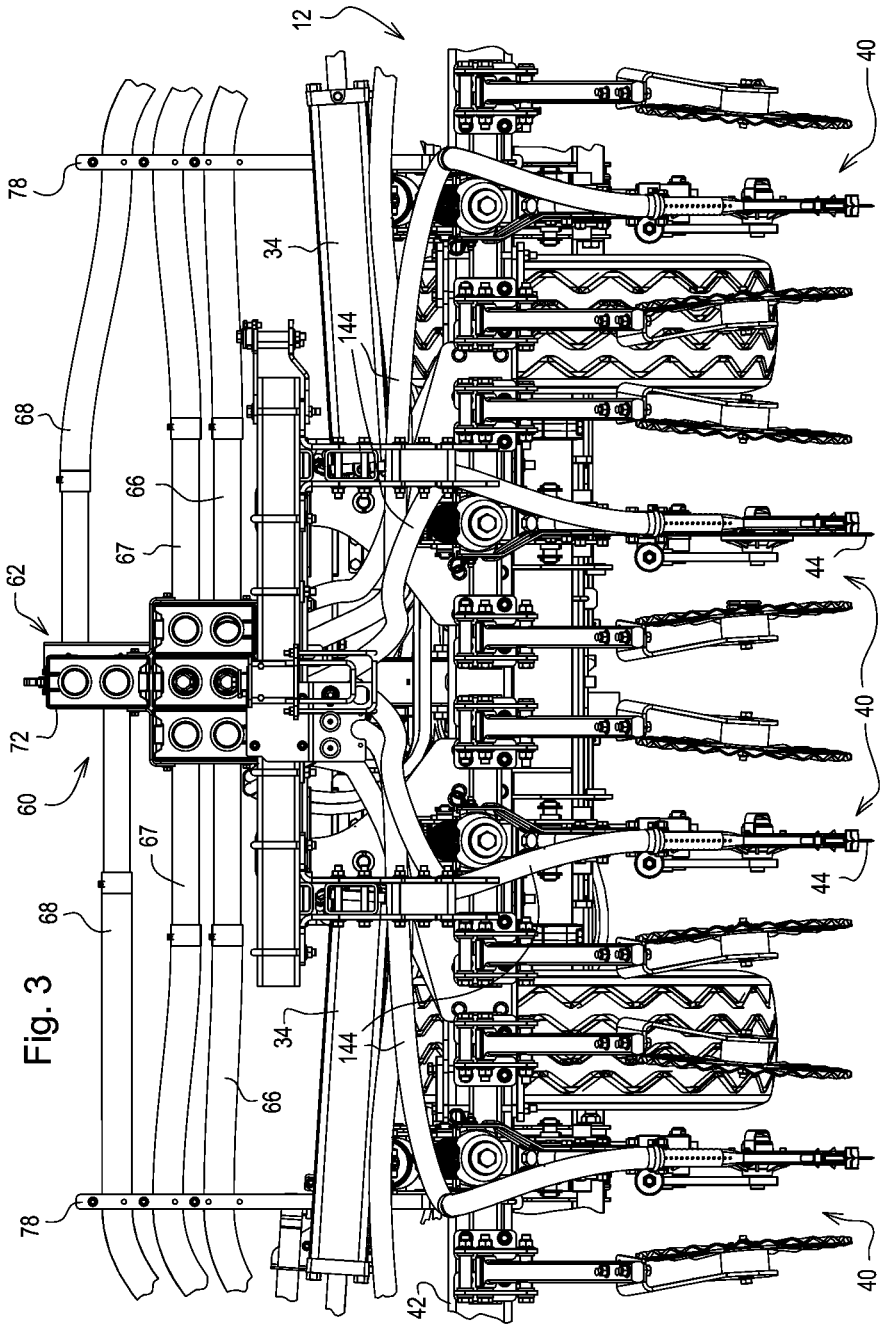
FIG. 3 is an enlarged rear view of the central portion of the implement of FIG. 1.
Figure 4:
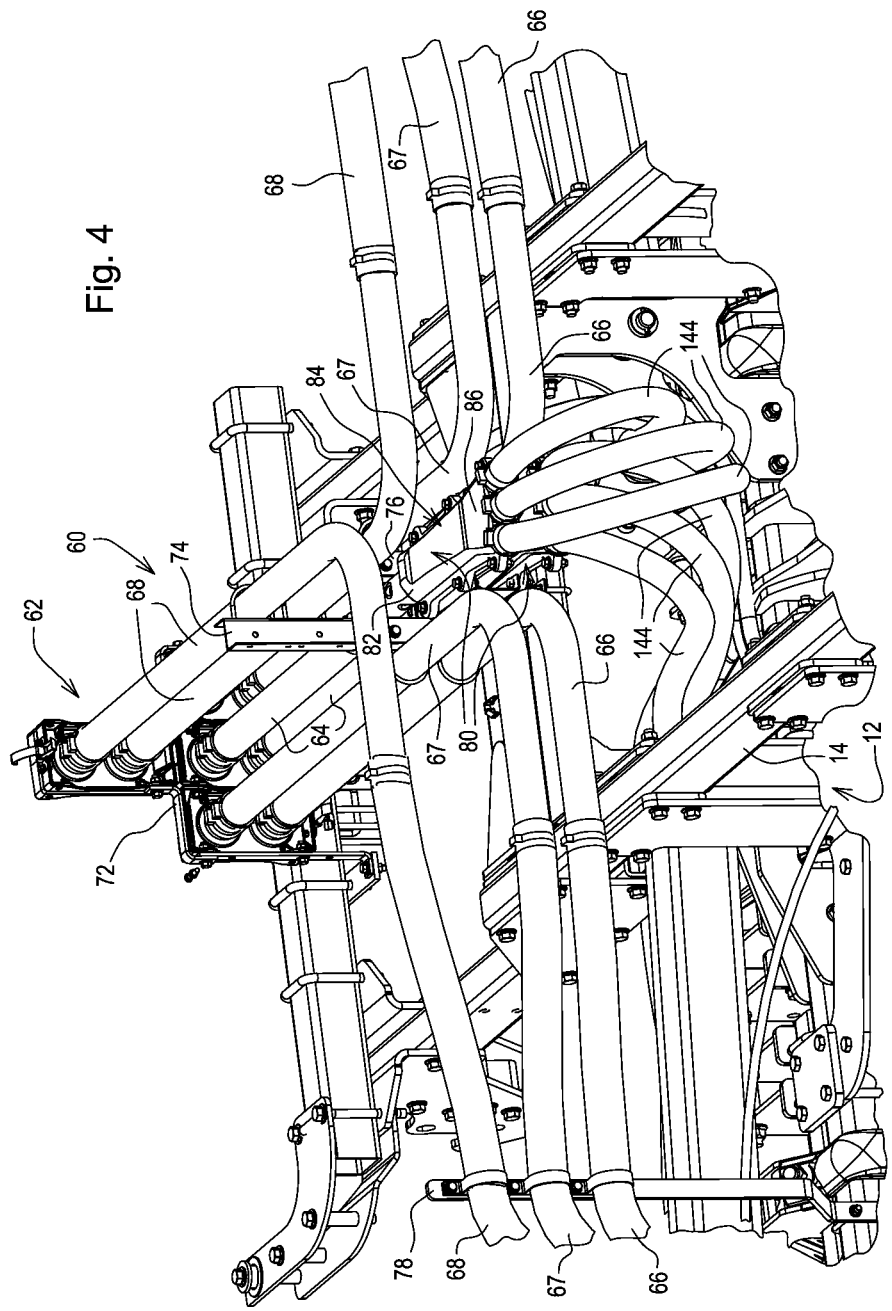
FIG. 4 is an enlarged front perspective view of the central portion of the implement of FIG. 1 showing the air system primary runs and splitters and secondary runs that deliver commodity to the tools on the central portion of the implement.

An air delivery system 60 mounted on the implement 10 provides material metered from a tank or trailing commodity cart (not shown) to the tools 40. For the embodiment shown, granular fertilizer or other commodity carried in the cart is metered to a plurality of primary air and commodity delivery conduits or runs connected to conventional metering and fan structure on the cart (not shown). The primary runs from the cart extend to a rear primary run connection location 62 on the main frame. Primary runs 64, 66, 67 and 68 supported from the center section 14 by bracket structures 72, 74, and 76 continue the generally fore-and-aft extending straight line runs from the cart at locations just over horizontal plane of the main frame 12 indicated generally at an 12p in FIG. 1. Forwardly of the connector bracket structure 72, the primary runs 66, 67 and 68 angle outwardly in the directions of the wing sections 16 and 18 and, as best seen in FIGS. 3 and 4, are supported from the frame 12 in stacked relationship by bracket structures 78.

In the embodiment shown in FIGS. 1-4, eight primary runs 64-68 are used to feed twenty-four delivery tools 40. To divide each of the primary runs 64-68 into multiple secondary runs, a splitter 80 (FIGS. 5-8) is provided. As shown, the splitter 80 is a granular material splitter having an input or upstream end 82 located at one end of a central chamber 84 and flaring to an output or downstream end 86. The splitter 80 includes similarly constructed upper and lower castings 80a and 80b which are mirror images of each other and which are secured together by nut and bolt structures or fasteners 88. The input end 82 of the assembled unit defines a circular input port 92 with a longitudinal axis 92a. The output end 86 includes three cylindrically shaped output ports 94, 96 and 98 having longitudinal axes 94a, 96a and 98a, respectively. The center axis 96a generally aligns with the input port axis 92a. The axes 94a and 98a are offset at a small acute angle to either side of the axis 92a to provide a minimal angle change in the direction of flow of a mixture of air and commodity flowing through the splitter 80 and to present a compact arrangement of splitter and primary and secondary runs at each splitter location on the implement 10.

Connected to the input end 82 of each splitter 80 is an elongated dimpled tube 100 having an axis aligned with the axis 92a. A collar 102 secured over the downstream end of the tube 100 is received within a groove 103 in the end 82 and held in place therein when the upper and lower castings 80a and 80b are secured together. The elongated tube 100 helps to straighten the mix of air and commodity delivered by the associated primary run to the splitter 80. Rows of inwardly directed tube dimples 106 further mix and evenly distribute the commodity in the air within the tube 100.

Figure 5:
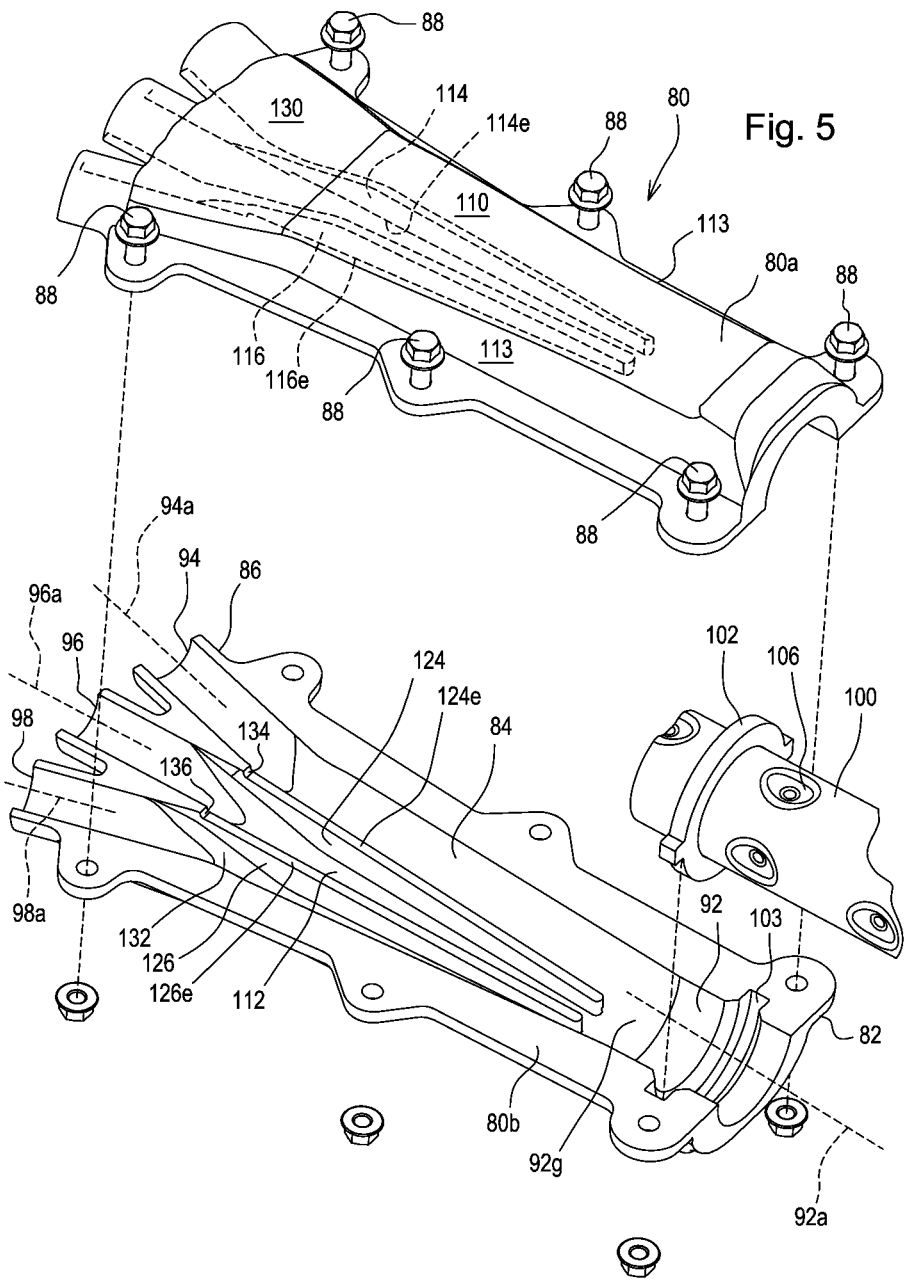
FIG. 5 is a perspective view of a splitter partially disassembled to better show the details of the interior channels and output port configuration.

The central chamber 84 connects the input port 92 with the output ports 94, 96 and 98 and divides the flow of commodity and air into multiple outputs. The chamber 84 includes first and second vertically offset planar upper and lower walls 110 and 112, which converge from the input port 92 towards the output ports 94-98 and are joined by upright sidewalls 113, which diverge from the input port 92 towards the output ports 94-98. Upright diverting fins 114 and 116 are connected to and extend from the first horizontal wall 110 towards the second wall 112 between upright sidewalls 113. The fins 114 and 116 terminate in longitudinal edges 114e and 116e offset above the second wall 112. Likewise in the embodiment shown, upright diverting fins 124 and 126 extend from the wall 112 towards the first wall 110 in the assembled unit. The fins 124 and 126 terminate in longitudinal edges 124e and 126e which are generally coextensive with but offset vertically from the edges 114e and 116e. The fins therefore divide the chamber 84 into three similar channels 94c, 96c and 98c which terminate at the output ports 94, 96 and 98. The offset edges, however, maintain a gap in the channels between the corresponding fins 114e-124e and 116e-126e so that the air pressure within the channels 94c, 96c and 98c is equalized. In addition, offsetting the fin edges to define a gap there between defines an enlarged open area or gap (see, for example, 129 of FIG. 7 and 129a of the alternate embodiment of FIG. 9) having an effective cross-sectional dimension that is larger than the cross-sectional dimension of the individual channels 94c, 96c and 98c so that large clumps of material or trash passing into the chamber are less likely to lodge between the fins or at the area of the input port 92 to cause a blockage. In addition, providing a gap or gaps between channels helps assure that commodity will be delivered to all the outputs when a temporary blockage occurs in an upstream area of the central chamber 84. Although gaps are shown as offset elongated edges on fins, other types of gap structure such as channel wall apertures, intermittent channel wall offsets, transversely aligned or fore-and-aft offset slots in the channels, and the like may be used. As best seen in FIG. 5, an open area 92g is also provided between the input port 92 and the upstream ends of the fins 114, 116 and 124, 126.

Figure 6:
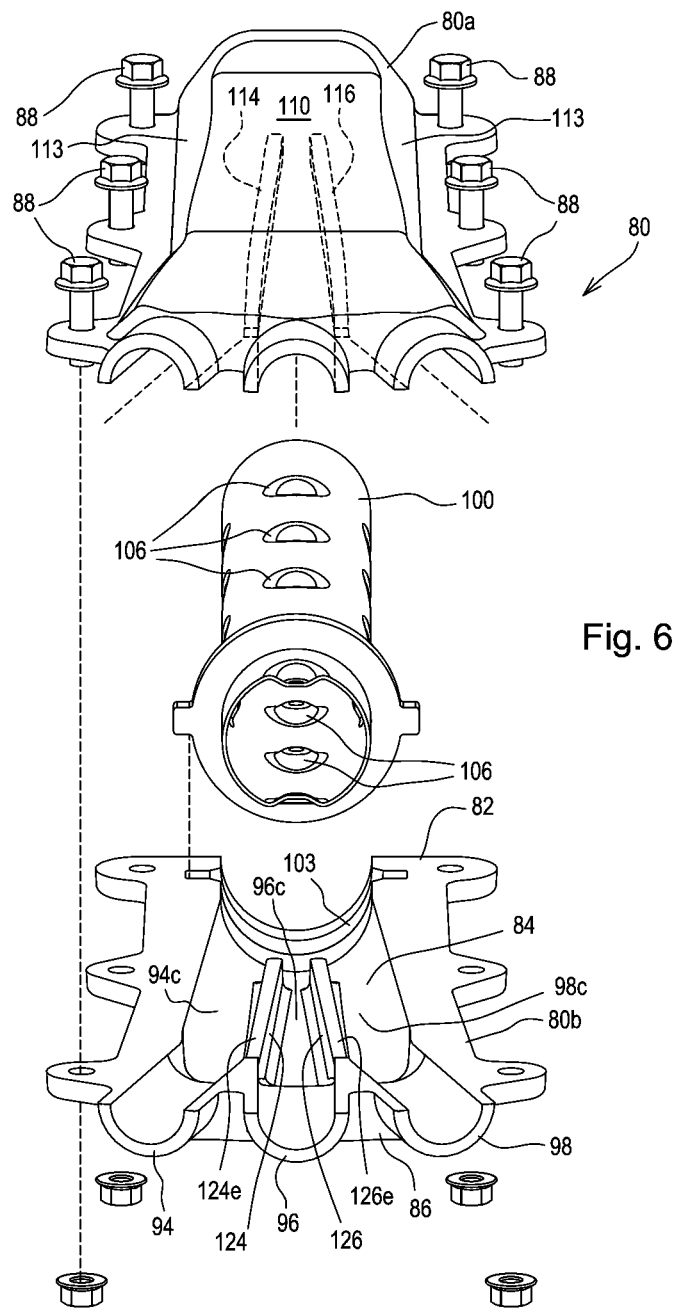
FIG. 6 is an perspective end view of a disassembled splitter taken from the output port side of the splitter.
Figure 7:
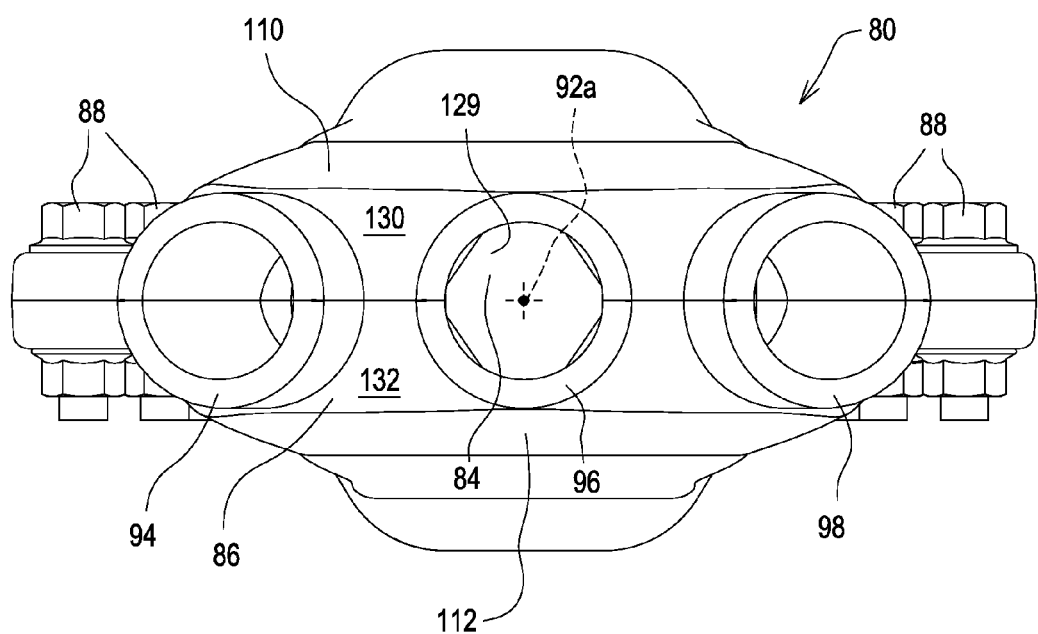
FIG. 7 is an end view of the output port side of the splitter of FIG. 5.
Figure 9:
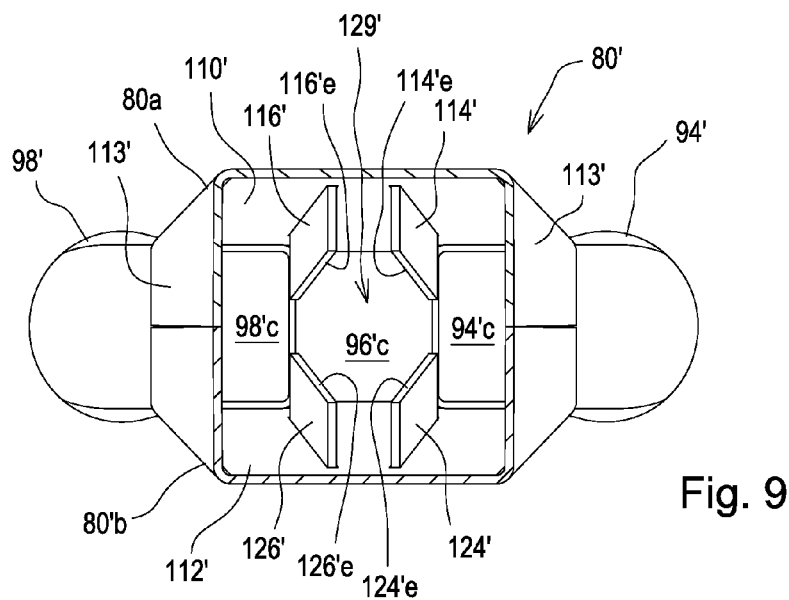
FIG. 9 is an end view, partially in section, taken from the input side of the splitter generally along lines 9-9 of FIG. 8.

The surfaces of the fins 114, 116, 124 and 126 mechanically divert material not fully entrained in the air flow. Simultaneously, air and material will divide by flowing over and around the offset fins. As best seen in FIGS. 5, 6 and 9, the fins are sloped in the downstream direction to increase engagement as the mixture of air and material progresses farther into the splitter 80. The chamber 84 increases in width and decreases in height in the downstream direction from the input port 92 to the output ports 94, 96 and 98. The channels 94c, 96c and 98c are generally rectangular in cross-section and taper to round configurations to define connecting ends. The fins 114, 116, 124 and 126 have downstream ends generally contiguous with the inner ends of the output ports 94, 96 and 98. The splitter 80 includes downstream end walls 130 and 132 which taper towards the output ports 94, 96 and 98. Short upright surfaces 134 and 136 define the transition area between the upstream ends of the output ports 94, 96 and 98 and the downstream ends of the fins 124 and 126 and provide equalization gaps between the fins that extend in the downstream direction all the way to the area of the output ports 94, 96 and 98.

Figure 8:
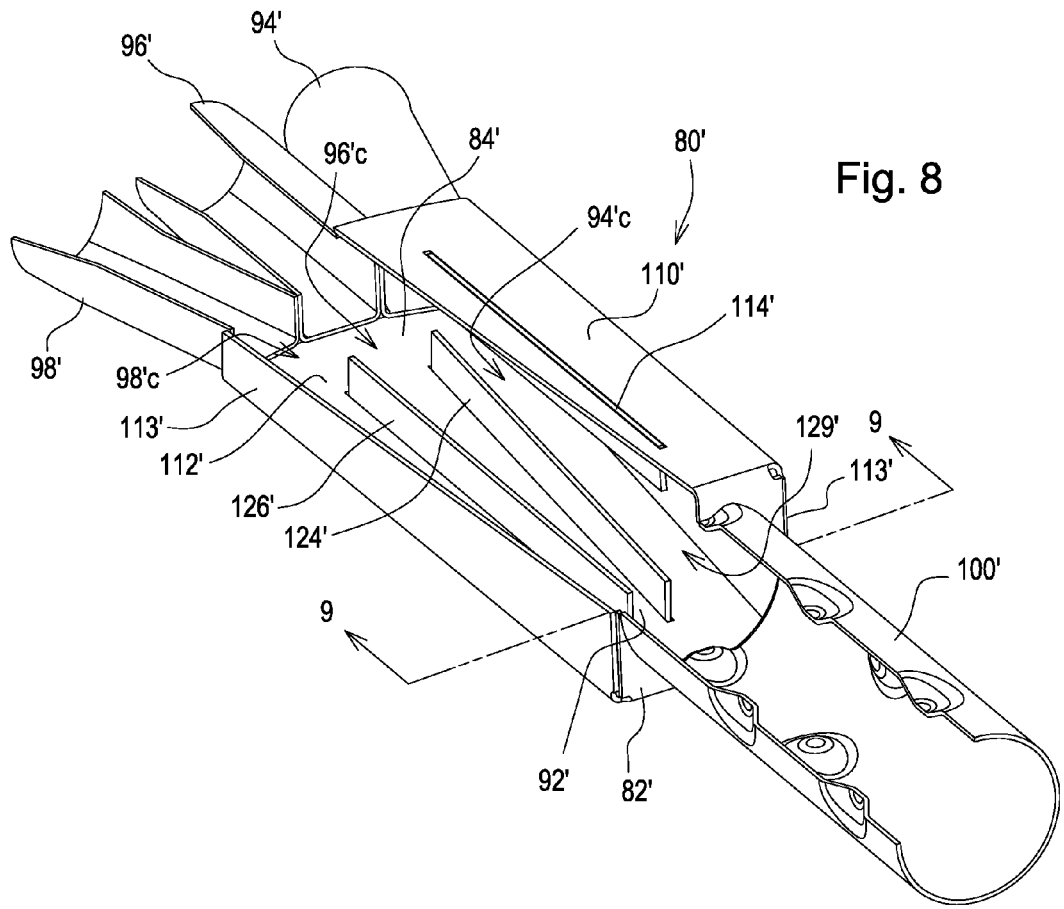
FIG. 8 is a perspective view of another embodiment of a splitter, partially in section to better show the splitter interior.

In an alternate embodiment of FIGS. 8 and 9, the splitter 80' is shown as fabricated from sheet metal with an input end 82' connected to the output end of a dimpled tube 100'. A central chamber 84' converges in the downstream direction from a height slightly greater than the diameter of the tube 100'at the input end 82' to a height approximately equal to the diameter of circular output ports while the chamber width increases in the downstream direction.

The central chamber 84' connects an input port 92' with the output ports 94', 96' and 98' and divides the flow of commodity and air into multiple outputs. The chamber 84' diverges outwardly from the input port 92' towards the output ports 94'-98' and includes first and second offset walls 110' and 112' with upright sidewalls 113'. Upright diverting fins 114' and 116' are connected to and extend from the first wall 110' towards the second wall 112' between upright sidewalls 113'. The fins 114' and 116' terminate in longitudinal edges 114'e and 116'e offset above the second wall 112'. Upright diverting fins 124' and 126' extend from the wall 112' towards the first wall 110'. The fins 124' and 126' terminate in longitudinal edges 124'e and 126'e which are generally coextensive with but offset vertically from the edges 114'e and 116'e to divide the chamber 84' into three channels 94'c, 96'c and 98'c which terminate just upstream of the output ports 94', 96' and 98'. As clearly seen in FIG. 9, a gap or open area 129' exists between the corresponding fins 114'e- 124'e and 116'e- 126'e so that the air pressure within the channels 94'c, 96'c and 98'c is equalized. The effective cross-sectional dimension of the gap 129' is larger than the cross-sectional dimension of the individual channels 94'c, 96'c and 98'c to help prevent clogging of the splitter by clumps of material or trash. The fin gaps converge in the downstream direction for increasing engagement of the material.

The fin and gap design may have various configurations other than as shown in the drawings. For example, the fins can project from the bottom only or the top only of the chamber. Alternatively, two sets of fins, one extending upwardly from the bottom of the chamber and one extending downwardly from the top of the chamber may be provided. The fins may also take the form of apertured walls or screens with areas of enlarged apertures. The fin size and a fin taper in the direction of particle flow can be varied depending on the commodity conveyed and the gap desired. Different numbers of channels may be provided, and the orientation of the splitter can be changed to best conform to the implement frame, tool, and hose configurations.

The compact splitter configuration facilitates stacking (FIG. 4) of two or more of the splitters 80. As shown, the bracket structure 76 supports two central splitters 80 at a central location on the frame 12 below the frame plane 12p. The central splitters 80 are fed by parallel stacked center section primary runs 64 extending forwardly from the rear primary run connection location 62. Each central splitter 80 divides the commodity flow from the primary runs 64 to three central secondary runs 144 to deliver a preselected amount of the material to the delivery tools 40 on the center section 14. Outer splitters 80 are mounted on the inboard wing sections 16 and outboard wing sections 18 and are fed by the primary runs 67 and 68, respectively, running transversely and generally parallel to the rear frame tube structure 42 of the main frame 12 for supplying secondary runs 146 and 148 and corresponding tools 40 on the wing sections 16 and 18. Splitters 80 fed from the primary runs 66 are located forwardly of the rear beam of the frame 12 on the inboard wing section 16 to feed the innermost tools 40 on the wing sections 16 via secondary runs 150.

In operation, a granular commodity such as fertilizer is metered from the commodity cart or other supply to the individual primary runs 64, 66, 67 and 68. The flow of commodity is uniformly divided by the splitters 80 into the multiple secondary runs 144, 146, 148 and 150 for delivery to the tools 40. Clumps of the material that might otherwise lodge in the channels 94c, 96c and 98c of a splitter 80 are allowed to pass via gap 129 which also helps maintain an even pressure distribution within the chamber 84. The chamber configuration also provides commodity flow to all the outputs 94, 96 and 98 if a partial blockage occurs in the upstream end of one of the channels 94c, 96c and 98c. Most of the routing of hoses and splitters provides a generally straight-line flow for efficient commodity delivery with any necessary bends in the routing being of relatively high radii.

We claim:

1. A granular material splitter for mounting on the frame of a commodity delivery device, the splitter having an elongated body with a single input port located at an upstream end of the body for receiving a flow of air and entrained material, multiple output ports located at a downstream end of the body opposite the upstream end, and a central portion connecting the input port with the output ports for dividing the flow into multiple outputs for delivery through the output ports, the improvement comprising:

the central portion comprising a chamber diverging from the input port to the output ports, the chamber having first and second vertically offset, planar walls, upright sidewalls connecting the first and second planar walls, a plurality of upright diverting fins extending longitudinally in said chamber between said input and output ports, being spaced from each other and said upright sidewalls and being connected to and extending vertically from the first planar wall towards the second wall, whereby the fins cooperate with the first planar wall and upright sidewalls to form material directing channels for directing an amount of the entrained material to each of the output ports in a downstream direction of travel of the entrained material from the input port to the output ports, the plurality of fins respectively terminating vertically in a plurality of longitudinal edges offset vertically from the second horizontal wall a distance resulting in a blockage preventing open area being defined between the longitudinal edges and the second wall allowing passage of clumps of the material with dimensions larger than the cross-sections of the material directing channels.

2. The splitter as set forth in claim 1 further comprising a horizontally disposed material flow-straightening and material mixing dimpled tube opening into the input port.

3. The splitter as set forth claim 2 in wherein the dimpled tube and input port are circular in cross-section and the multiple output ports respectively have rectangular cross-sections adjacent the material directing channels defined in part by the plurality of diverting fins.

4. The splitter as set forth claim 1 wherein the cross-sections of the multiple outputs taper from rectangular cross-sections to circular cross-sections at downstream ends of the output ports to facilitate attachment of material conveying conduits with circular cross-sections, wherein the splitter, the input port and the output ports, and the material conveying conduits adjacent the splitter are configured for lying closely adjacent and generally parallel to the frame.

5. The splitter as set forth in claim 1 wherein the chamber includes a second plurality of fins extending vertically from the second planar wall, the second plurality of fins respectively having second longitudinal edges offset vertically from the longitudinal edges of said plurality of fins extending vertically from the first planar wall and defining therewith the blockage preventing open area.

6. The splitter as set forth in claim 1 wherein the longitudinal edges respectively of said plurality of fins extending vertically from the first planar wall are sloped so as to converge toward said second planar wall in the downstream direction and thereby increasingly engage the entrained material in the downstream direction.

7. The splitter as set forth in claim 1 wherein the output ports comprise only three output ports.

8. The splitter as set forth in claim 1 wherein the input port and the output ports have longitudinal axes that lie generally within a substantially horizontal splitter plane, with the longitudinal axis of one of the output ports being located along the longitudinal axis of the one input port.

9. The splitter as set forth in claim 8 wherein the output ports support secondary hoses, the secondary hoses lying generally parallel to each other and to the splitter plane.

10. A granular material splitter for mounting on an elongated frame member of a commodity delivery device, the splitter having an elongated hollow body with a single input port located along a central longitudinal axis of, and at an upstream end of, the body for receiving a flow of air and entrained material flowing in a downstream direction toward a downstream end of the body, at least three output ports located at said downstream end of the body opposite the upstream end, and a central portion of said body connecting the input port with the output ports for dividing the flow into multiple outputs for delivery through the output ports, the improvement comprising:

the central portion comprising a chamber having first and second opposite walls spaced equally from said central longitudinal axis, at least two spaced apart, longitudinally extending diverting fins connected to and extending from the first wall towards the second wall to form longitudinal material directing channels respectively aligned with inlet ends of said at least three output ports for directing an amount of the entrained material to each of the output ports in a direction of travel of the entrained material from the input port to the output ports, and said at least two diverting fins respectively having longitudinal edges spaced apart from the second wall of the chamber whereby a pressure equalization open area is defined between the second wall and said longitudinal fin edges and extending between the channels for equalizing air pressure within the channels.

11. The splitter as set forth in claim 10 including at least two more fins connected to and extending from the second wall towards said first wall and respectively having longitudinal edges terminating at locations offset from the longitudinal edges of said at least two diverting fins.

12. The splitter as set forth in claim 10 wherein the first and second walls are upper and lower walls which converge toward each other in a direction from said input port towards said output ports.

13. The splitter as set forth in claim 10 wherein the first and second walls are generally planar, the at least two diverting fins are each connected to the first wall at a right angle whereby the material directing channels are substantially rectangular in cross-section and the output ports include circular connecting portions for receiving round secondary hoses.

14. The splitter as set forth in claim 10 wherein the diverting fins have upstream ends offset from the input port to define a generally open input area within the chamber extending in the downstream direction from the input port to the upstream ends of the diverting fins.

15. The splitter as set forth in claim 10 wherein the diverting fins have downstream ends offset from the output ports to define a generally open output area within the chamber extending in the downstream direction from the downstream ends of the diverting fins to the output ports.

16. The splitter as set forth in claim 10 wherein the first wall converges towards the second wall in the downstream direction.

17. The splitter as set forth in claim 10 wherein the output ports have upstream port ends opening into the chamber, and wherein the diverting fins have downstream ends generally contiguous with the upstream port ends.

* * * * *